Dec. 24, 1968  F. E. RYDER  3,417,614
LIQUID LEVEL INDICATOR
Filed Feb. 21, 1966
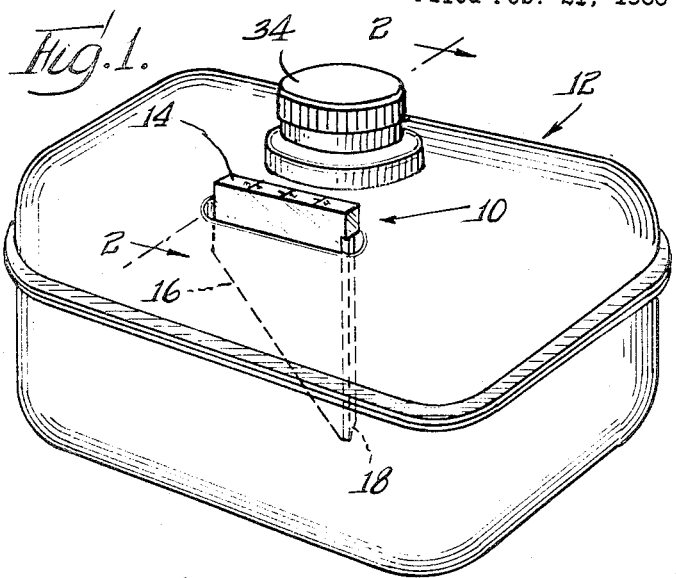
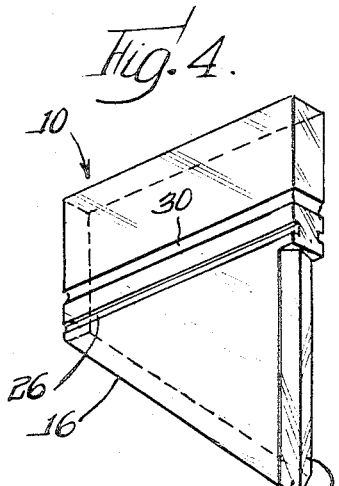
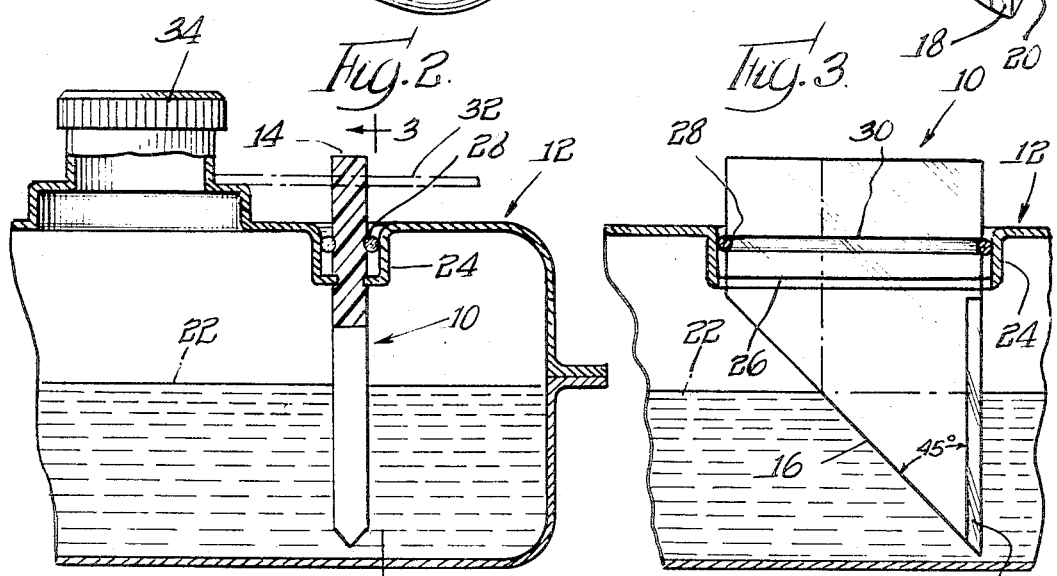
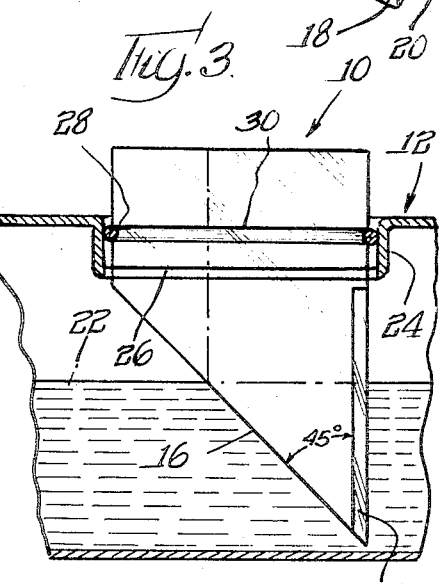
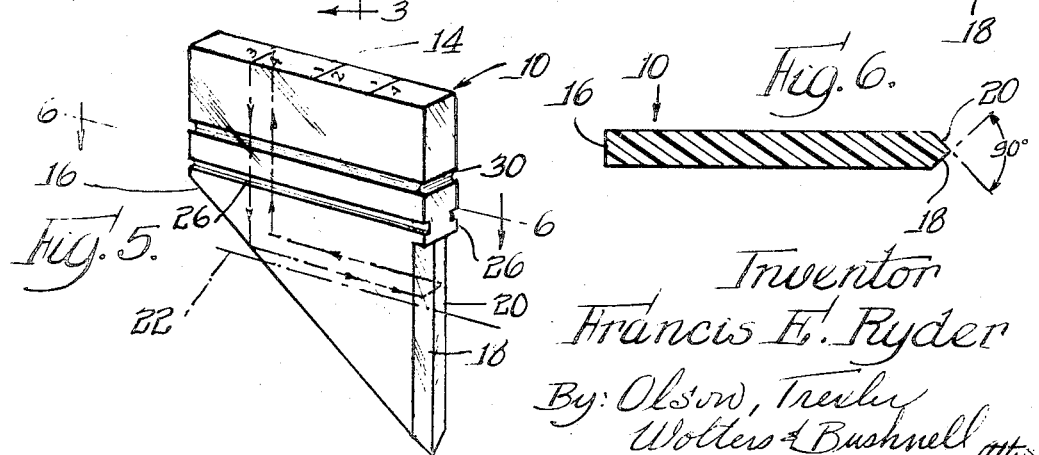
Inventor
Francis E. Ryder
By: Olson, Trexler
Wolters & Bushnell attys.

United States Patent Office 3,417,614
Patented Dec. 24, 1968

3,417,614
LIQUID LEVEL INDICATOR
Francis E. Ryder, Bartlett, Ill., assignor to Illinois Tool Works Inc., Chicago, Ill., a corporation of Delaware
Filed Feb. 21, 1966, Ser. No. 529,019
9 Claims. (Cl. 73—327)

ABSTRACT OF THE DISCLOSURE

A liquid level indicator in the form of a transparent plate-like light transmitting member having a first edge surface extending downwardly at an angle of forty-five degrees from an upper light receiving edge for reflecting light to a pair of V-shaped surfaces depending vertically downward from the opposite extremity of the light receiving edge whereby the light will be reflected back to the first edge surface and upwardly to the light receiving edge.

---

This application discloses one embodiment of the invention which consists of a plate-like light transmitting member having an upper light-receiving edge or surface adapted to face upwardly from the upper wall of a liquid container. A pair of vertical light-receiving and reflecting surfaces disposed at ninety degrees with respect to each other extend downwardly to a point adjacent the bottom of a liquid container. Extending at an angle of forty-five degrees from the lower extremity of said downwardly extending light-receiving and reflecting surfaces is an edge surface, the upper extremity of which terminates at a point substantially in horizontal alignment with the upper extremities of the downwardly extending edge surfaces. Light rays received by the upper edge of the plate-like member are directed to the surface inclined at forty-five degrees, which in turn reflect horizontally to the pair of downwardly extending edges disposed at ninety degrees with respect to each other. Such light rays are reflected back to the surface inclined at forty-five degrees and redirected to the upper edge of the plate-like member. Only that portion of the plate-like member which is positioned above the surface of the liquid in a container will reflect light rays and hence the upper edge surface serves to indicate the level of the fluid in the container.

It is an important object of the present invention to provide a light-transmitting liquid level indicator of extremely simple, yet very practical form adapted to be supported by and to depend from the upper wall of a liquid container.

More specifically the present invention contemplates an improved, novel indicator member of light transmitting material adapted to receive light at the upper exterior of a liquid container and to so reflect such light as to indicate accurately the fluctuating level of liquid in the container.

Still more specifically it is contemplated that the above-mentioned objects and advantages will be accomplished by the use of a unitary sheet-like or plate section of light transmitting material of unique geometric design.

The foregoing and other objects and advantages will be more apparent from the following detailed description when considered in connection with the accompanying drawings wherein:

FIG. 1 is a perspective view of a liquid container having in association therewith a liquid level indicator of the type contemplated by the present invention;

FIG. 2 is a fragmentary vertical transverse sectional view taken substantially along the line 2—2 of FIG. 1;

FIG. 3 is a vertical sectional view taken substantially along the line 3—3 of FIG. 2;

FIG. 4 is a perspective view of the light transmitting liquid level indicator of the present invention as viewed from below the upper level indicating surface thereof;

FIG. 5 is a perspective view similar to FIG. 4, illustrating the level indicating element of the present invention as viewed from above the aforesaid upper surface thereof; and FIG. 6 is a horizontal sectional view of the level indicating member taken substantially along the line 6—6 of FIG. 5.

Referring now to the drawing more in detail, wherein like numerals have been employed to designate similar parts throughout the various figures, it will be seen that a liquid level indicator representative of one embodiment of the present invention is designated generally by the numeral 10. In FIGS. 1, 2 and 3, the level indicator 10 is illustrated in operative association with a liquid container 12. For the purpose of disclosing one practical application of the liquid level indicator 10, the container 12 is in the form of a conventional gasoline tank commonly used in association with outboard motors, lawn mowers and other types of internal combustion engine driven devices. However, it may be used in any container to indicate the level of any fluid of proper viscosity and proper translucence.

The liquid level indicator member 10 is preferably formed of suitable relatively thin plate or sheet light transmitting and light reflective plastic material or glass having a novel geometric shape. The upper edge surface 14 of the member 10 is located in an exposed position with respect to the container or tank 12. As indicated by the arrows and dotted lines in FIG. 5, light received by the exposed surface or edge 14 is directed downwardly to an edge surface 16 which is disposed at a 45 degree angle with respect to the edge surface 14. These light rays are reflected horizontally to a vertically disposed edge surface 18 which is inclined at approximately 45 degrees to the plane of the member 10. This surface 18 causes the light ray to be reflected at 90 degrees to an opposite complementary vertical edge surface 20. The surface 20 is disposed at 90 degrees with respect to the surface 18 and light rays from the surface 20 are reflected back to the surface 16 and thence upwardly to the exposed horizontal surface 14. Thus it will be understood that if the vessel 12 contained no liquid, the entire surface 14 would be illuminated with reflected light.

It will be understood that light will only be reflected from that portion of the surfaces 16, 18 and 20 of the member 10 not immersed within the liquid of the container 12. In FIGS. 2, 3 and 5, the liquid level is indicated by the horizontal dot-and-dash line 22. This liquid level 22 indicates that the container 12 is substantially half-filled with liquid. Under these circumstances, the only portion of the light receiving edge surface 14 which will be illuminated is that which is positioned to the left of the one-half mark indicated on this edge surface, FIG. 5. The remainder of this surface, positioned to the right of the one-half mark, will not be illuminated because the portion of the surfaces 16, 18 and 20 of the member 10, positioned immediately below this area, are immersed in the liquid. Thus, if the container is completely filled with liquid, no portion of the light receiving surface 14 will be illuminated.

In the disclosed embodiment, the level indicator is held at its upper portion within a depressed container wall section 24 of the container 12. The container wall section 24 defines an opening at the top of the container for telescopically receiving or accommodating the member 10.

Oppositely disposed horizontal grooves 26 in the level indicator 10 are adapted to accommodate the complementary edge flanges of the depressed container wall section 24, clearly shown in FIG. 2. A resilient sealing ring or element 28 encircles the member 10 within a groove 30 and is sealingly interposed between the member 10 and the walls of the section 24. The opposed side walls of the section 24 may be flexed laterally to permit insertion of the indicator member. This arrangement prevents liquid from splashing out of the tank or container 12. Also, if the container is not vented, it will seal against vapor leak up to about 50 p.s.i. In most instances a suitable type of shield is employed to prevent the accumulation of foreign matter in the vicinity of the member 10. Such shield is diagrammatically indicated by the dot-and-dash lines 32 of FIG. 2. The container 12 is provided with a suitable closure member 34 which may be removed to permit filling of the container.

It will be apparent from the foregoing description that the present invention contemplates a very simple, inexpensive, yet highly efficient level indicator for indicating levels of liquid subject to fluctuation. The unitary, plate-like or sheet-like light transmitting member is provided along its upper, generally horizontal light receiving edge surface means with indicia indicating the various fluctuating levels of the liquid in the container. The generally vertical edge surface means extending downwardly from one extremity of the above-mentioned horizontal edge surface and the light-reflective edge surface means extending downwardly from adjacent the opposite extremity of said horizontal surface in approaching relation with respect to the lower extremity of the vertical edge, present a triangular form which functions efficiently to receive light from and to reflect light to the upper horizontal edge or surface. By having the acute corner of the generally triangularly-shaped level indicator depending within the container, an infinite variation in liquid levels may be indicated and readily observed along the upper horizontal surface edge of the member. The indicia shown on the upper edge surface 14 may instead be engraved on the edge surface 16 and reflected to the surface 14.

While a specific embodiment of the invention is disclosed herein for purposes of illustration, it will be understood that the level indicator member may vary in certain geometric respects without departing from the spirit and scope of the appended claims.

The invention is claimed as follows:

1. A level indicator for indicating levels of liquid subject to fluctuation, including a plate-like light-transmitting member having an upper light-receiving edge surface means, a generally vertical edge surface means extending downwardly from one extremity of said upper edge surface means and including a pair of vertical surfaces intersecting at 90°; and an oppositely disposed light reflective edge surface means extending downwardly at substantially 45° with respect to said upper edge surface means in approaching relation with respect to the lower extremity of said vertical edge surface means and adapted to depend within a body of liquid subject to level fluctuations, said light reflective edge surface means so disposed angularly with respect to said upper edge surface means and said vertical edge surface means as to receive and reflect light on only the portion thereof located above the level of a body of liquid.

2. A level indicator for indicating levels of liquid subject to fluctuation as set forth in claim 1 wherein the reflective surface disposed at substantially forty-five degrees with respect to the upper edge surface means has a vertical dimension substantially equal to the linear dimension of said vertical edge surface means.

3. A level indicator for indicating levels of liquid subject to fluctuation as set forth in claim 1 wherein said pair of light reflective surfaces disposed at ninety degrees intersect along a substantially vertical line for receiving light from and reflecting light to said light reflective edge surface means.

4. A level indicator for indicating levels of liquid subject to fluctuation as set forth in claim 1 wherein the light reflective edge surface means is flat and longitudinally continuous from its upper extremity to a position adjacent the lower extremity of said vertical edge surface means.

5. A level indicator for indicating levels of liquid subject to fluctuation as set forth in claim 1 wherein the upper portion of said plate-like member is provided with recess means for accommodating the upper wall portion of a liquid container.

6. In combination with a container for enclosing a liquid body, a level indicator for indicating levels of liquid in said container, said indicator including a plate-like light transmitting member having an upper light receiving edge surface means disposed in the vicinity of the top of said container, a generally vertical edge surface means extending downwardly from one extremity of said upper edge surface means and including a pair of vertical surfaces intersecting at ninety degrees, light reflective edge surface means extending downwardly at substantially forty-five degrees with respect to said upper edge surface means in approaching relation with respect to the lower extremity of said vertical edge surface means to a position adjacent the bottom of said container, said light reflective edge surface means so disposed angularly with respect to said upper edge surface means and said vertical edge surface means as to receive and reflect light on only the portion thereof located above the level of a body of liquid within the container, and means for securing the upper portion of said indicator member in a predetermined position within the top wall structure of said container.

7. The combination as set forth in claim 6 wherein the top wall structure of the container is apertured to telescopically receive said plate-like level indicator.

8. The combination as set forth in claim 6 wherein sealing means encircles the upper portion of the plate-like light transmitting indicator member to prevent leakage of liquid from within the container.

9. The combination as set forth in claim 8 wherein the top wall portion of the container is provided with a downwardly depressed section which is apertured to accommodate the plate-like light transmitting indicator member.

References Cited

UNITED STATES PATENTS

| 1,883,971 | 10/1932 | Kryzanowsky | 73—327 |
| 2,767,754 | 10/1956 | Lederer et al. | |
| 3,273,267 | 9/1966 | Willman | 73—327 X |

FOREIGN PATENTS

| 490,441 | 2/1953 | Canada. |
| 672,539 | 5/1952 | Great Britain. |

S. CLEMENT SWISHER, *Primary Examiner.*

D. M. YASICH, *Assistant Examiner.*

U.S. Cl. X.R.

88—14